(12) United States Patent
Farres et al.

(10) Patent No.: US 11,904,829 B2
(45) Date of Patent: Feb. 20, 2024

(54) ELECTRO-PNEUMATIC BRAKE SYSTEM FOR A VEHICLE WITH A PARK BRAKE SYSTEM USED AS A BACKUP DECELERATION SYSTEM

(71) Applicant: Volvo Truck Corporation, Gothenburg (SE)

(72) Inventors: Lionel Farres, Heyrieux (FR); Martin Monnier, Villeurbanne (FR)

(73) Assignee: Volvo Truck Corporation, Gothenburg (SE)

( * ) Notice: Subject to any disclaimer, the term of this patent is extended or adjusted under 35 U.S.C. 154(b) by 291 days.

(21) Appl. No.: 17/521,943

(22) Filed: Nov. 9, 2021

(65) Prior Publication Data

US 2022/0153248 A1    May 19, 2022

(30) Foreign Application Priority Data

Nov. 13, 2020  (EP) .................................... 20207529

(51) Int. Cl.
  *B60T 8/94*     (2006.01)
  *B60T 7/12*     (2006.01)
  (Continued)

(52) U.S. Cl.
  CPC .................. *B60T 8/94* (2013.01); *B60T 7/12* (2013.01); *B60T 8/176* (2013.01); *B60T 8/34* (2013.01);
  (Continued)

(58) Field of Classification Search
  CPC ........ B60T 8/1887; B60T 8/94; B60T 13/662; B60T 7/12; B60T 8/1755; B60T 8/176;
  (Continued)

(56) References Cited

U.S. PATENT DOCUMENTS

| | | | |
|---|---|---|---|
| 2019/0337502 A1* | 11/2019 | Farres | B60T 15/027 |
| 2021/0370898 A1* | 12/2021 | Eckert | B60T 8/1708 |
| 2023/0009033 A1* | 1/2023 | Monnier | B60T 8/92 |

FOREIGN PATENT DOCUMENTS

| | | |
|---|---|---|
| WO | 2019210952 A1 | 11/2019 |
| WO | 2019210964 A1 | 11/2019 |

OTHER PUBLICATIONS

Intention to Grant for European Patent Application No. 20207529.7, dated Aug. 3, 2023, 33 pages.
(Continued)

*Primary Examiner* — Pamela Rodriguez
(74) *Attorney, Agent, or Firm* — Withrow & Terranova, PLLC (57) ABSTRACT

An electro-pneumatic brake system for an automotive vehicle comprising brake actuators each with a service brake chamber and a park brake chamber, a service brake system forming a pneumatic main deceleration system and comprising service brake lines configured to supply air pressure to the service brake chamber of the brake actuators, a park brake system forming a pneumatic immobilization system and a backup pneumatic deceleration system, and comprising park brake lines configured to supply air pressure to the park brake chamber of the brake actuators, wherein the park brake system comprises a pressure controller device configured to perform a wheel anti-locking function under a condition of the park brake system being used as a backup deceleration system, the pressure controller device being configured to control the air pressure supply in the park brake lines.

16 Claims, 4 Drawing Sheets

(51) Int. Cl.
  *B60T 8/176*   (2006.01)
  *B60T 8/34*    (2006.01)
  *B60T 13/66*   (2006.01)
  *B60T 17/08*   (2006.01)
  *B60T 17/22*   (2006.01)

(52) U.S. Cl.
  CPC .......... *B60T 13/662* (2013.01); *B60T 17/083* (2013.01); *B60T 17/221* (2013.01); *B60T 2240/00* (2013.01); *B60T 2250/00* (2013.01); *B60T 2250/03* (2013.01); *B60T 2270/10* (2013.01); *B60T 2270/402* (2013.01); *B60T 2270/406* (2013.01); *B60T 2270/413* (2013.01); *B60T 2270/88* (2013.01)

(58) Field of Classification Search
  CPC . B60T 8/1761; B60T 8/34; B60T 8/88; B60T 13/683; B60T 17/083; B60T 17/18; B60T 17/221; B60T 2270/10; B60T 2270/402; B60T 2270/413; B60T 2240/00; B60T 2250/00; B60T 2270/406; B60T 2270/88
  See application file for complete search history.

(56) References Cited

OTHER PUBLICATIONS

Extended European Search Report for European Patent Application No. 20207529.7, dated Feb. 15, 2021, 6 pages.

\* cited by examiner

-- PRIOR ART --

FIG. 6

ELECTRO-PNEUMATIC BRAKE SYSTEM FOR A VEHICLE WITH A PARK BRAKE SYSTEM USED AS A BACKUP DECELERATION SYSTEM

RELATED APPLICATIONS

The present application claims priority to European Patent Application No. 20207529.7, filed on Nov. 13, 2020, and entitled "ELECTRO-PNEUMATIC BRAKE SYSTEM FOR A VEHICLE WITH A PARK BRAKE SYSTEM USED AS A BACKUP DECELERATION SYSTEM," which is incorporated herein by reference in its entirety.

FIELD OF THE INVENTION

This invention relates to an electro-pneumatic brake system for automotive vehicles, particularly for automated vehicles and/or vehicles having basic or elaborate autonomous drive features, where redundancy is required to cope with a situation where a main deceleration system may become unavailable. In particular, automated vehicles like trucks or medium duty or heavy duty vehicles require an electro-pneumatic brake system which shall exhibit some redundancy.

This invention also relates to an automotive vehicle equipped with such an electro-pneumatic brake system.

BACKGROUND OF THE DISCLOSURE

In the field of automotive vehicles, reliable trajectory control is among the prominent safety features required for ensuring smooth and secure traffic on roads. More particularly, steering and braking function are of utmost importance, let alone drivetrain torque control.

Automated vehicles require a reliable and powerful braking function. The braking function relies, in particular for trucks, and more generally for heavy duty vehicles, on an electro-pneumatic system using air under pressure as working fluid.

It has long been made compulsory to provide two independent pneumatic circuits, as a redundant arrangement in order to keep a braking capability in case one circuit undergoes a failure. The first independent pneumatic circuit provides air supply to a service brake system of the vehicle and the second independent pneumatic circuit provides air supply to a park brake system.

The service brake system is used to slow down and to stop the vehicle during normal operation, whatever the speed of the vehicle, and thus forms what is called a deceleration system of the vehicle. The park brake system is used mainly to maintain the vehicle stopped when it is not in use, and thus forms what is called an immobilization system of the vehicle.

Now, with the outlook of autonomous vehicles and vehicle automation, it becomes essential to provide a redundancy of the brake system with trajectory control.

In documents WO2019210964 and WO2019210952, the instant applicant has proposed solutions to implement redundant braking configuration for service braking. However, these solutions are somehow complicated and require various additional components which render the system less cost-effective and heavier.

The inventors have endeavored to find an alternative solution for providing an electro-pneumatic brake system having a redundant deceleration system providing trajectory control which is simple and cost effective.

SUMMARY OF THE DISCLOSURE

According to one aspect of the present invention, it is disclosed an electro-pneumatic brake system for an automotive vehicle comprising:
  a plurality of brake actuators each with a service brake chamber and a park brake chamber,
  a service brake system forming a pneumatic main deceleration system and comprising at least one service brake line configured to supply air pressure to the service brake chamber of at least one of the plurality of brake actuators,
  a park brake system forming on the one hand a pneumatic immobilization system and on the other hand a backup pneumatic deceleration system, and comprising at least one park brake line configured to supply air pressure to the park brake chamber of at least one of the plurality of brake actuators,
  wherein the park brake system comprises a pressure controller device configured to perform at least a wheel anti-locking function under a condition of the park brake system being used as a backup deceleration system, the pressure controller device being configured to control the air pressure supply in the at least one park brake line.

In this arrangement, the backup deceleration system is realized by using the at least one park brake line of the park brake system, providing a simple and cost effective brake system with a redundancy of the deceleration system. In other words, the park brake function is not only used in binary mode for immobilization of the vehicle, but it is also advantageously used in a modulated or regulated fashion under backup deceleration function.

The redundancy of the deceleration system is achieved without modifying the usual service brake system. Only the park brake system of the vehicle is modified. As the service brake system remains identical to known service park brake system complying with regulations, no further tests are needed for the service brake system to evaluate their compliance with regulations. Only the park brake system needs to be evaluated and/or pass the compliance test(s).

Moreover, as the park brake system comprises a pressure controller for performing a wheel anti-locking function (ABS function) in the backup deceleration system, it ensures that the trajectory of the vehicle can be controlled when the vehicle is slowed down and stopped during various driving circumstances, even when the backup deceleration system (i.e. park brake) is used instead of the main deceleration system (i.e. service brake). The pressure controller can for example be a pressure control valve. Modulation/regulation of braking pressure under backup deceleration phase ensures optimal braking even though the normal service braking has suffered a malfunction.

In various embodiments of the invention, one may possibly have recourse in addition to one and/or other of the following arrangements, taken alone or in combination.

According to one aspect, the park brake system comprises a stabilization device configured to perform a vehicle stabilization control function under the condition of the park brake system being used as a backup deceleration system, the stabilization device being configured to control the air pressure supply in the at least one park brake line.

The stabilization device can be on each park brake line or centralized upstream the park brake lines. For example, the stabilization device comprises an electronic brake force distribution system. The stabilization device provides a better control of the trajectory of the vehicle by applying more or less braking pressure ('regulation') to each wheel in order to maximize stopping power whilst maintaining vehicle control, especially in turns and/or curvy roads. Thanks to the stabilization control function, some wheel slippage may be allowed in order to maximize overall braking efficiency, while still maintaining stability (i.e. avoiding swerving).

According to one aspect, the service brake system comprises main motion sensors including at least main wheel speed sensors, the air pressure supply in the service brake line being controlled depending on main wheel speed signals received from the main wheel speed sensors, and the park brake system comprises backup motion sensors including at least backup wheel speed sensors, the air pressure supply in the park brake line being controlled depending on backup wheel speed signals received from the backup wheel speed sensors under the condition of the park brake system being used as a backup deceleration system.

The backup deceleration system has its own wheel speed sensors. In case of a failure of the main deceleration system, the backup wheel speed sensors provide a backup wheel speed signal which is independent from the main wheel speed signal. The backup wheel speed sensors thus improve the redundancy of the brake system.

According to one aspect, the main motion sensors include main stability sensors comprising a main lateral acceleration sensor and/or a main longitudinal acceleration sensor and/or a main yaw rate sensor, the air pressure supply in the service brake line being monitored depending on main stability signals received from the main stability sensors, and the backup motion sensors include backup stability sensors comprising a backup lateral acceleration sensor and/or a backup longitudinal acceleration sensor and/or a backup yaw rate sensor, the air pressure supply in the park brake line being monitored depending on backup stability signals received from the backup stability sensors under the condition of the park brake line being used as a backup deceleration system.

The lateral sensor, the longitudinal sensor, and the yaw rate sensor are computed to determine in real-time fashion the dynamic behavior of the vehicle. Given this information, the braking system can adapt in real-time the braking force to prevent lateral slippage or veering. The backup deceleration system has its own lateral sensor and/or longitudinal sensor and/or yaw rate sensor. In case of a failure of the main deceleration system, the backup stability sensors provide a backup stability signal which is independent from the main wheel speed signal. The air pressure supply in the park brake lines depends only on the backup stability signal. The backup stability sensors thus improve the redundancy of the brake system.

According to one alternative, the main motion sensors include main stability sensors comprising a main lateral acceleration sensor and a main longitudinal acceleration sensor, the air pressure supply in the service brake line being monitored depending on main stability signals received from the main stability sensors, and the backup motion sensors include backup stability sensors comprising a backup lateral acceleration sensor and/or a backup longitudinal acceleration sensor, the air pressure supply in the park brake line being monitored depending on backup stability signals received from the backup stability sensors under the condition of the park brake line being used as a backup deceleration system. In this case, the longitudinal and lateral acceleration sensors are taken as first-order information for behaviour determination, and the yaw rate sensor may be optional.

According to one alternative, the main motion sensors include main stability sensors comprising a main lateral acceleration sensor and a main longitudinal acceleration sensor, the air pressure supply in the service brake line being monitored depending on main stability signals received from the main stability sensors, and the backup motion sensors include backup stability sensors comprising a backup lateral acceleration sensor and/or a backup longitudinal acceleration sensor, the air pressure supply in the park brake line being monitored depending on backup stability signals received from the backup stability sensors under the condition of the park brake line being used as a backup deceleration system. In this case, longitudinal and lateral acceleration sensors are taken as first-order information for behaviour determination, yaw rate sensor may be optional.

According to one alternative, the main motion sensors include main stability sensors comprising a main lateral acceleration sensor, a main longitudinal acceleration sensor and a main yaw rate sensor, the air pressure supply in the service brake line being monitored depending on main stability signals received from the main stability sensors, and the backup motion sensors include backup stability sensors comprising a backup lateral acceleration sensor, a backup longitudinal acceleration sensor and a backup yaw rate sensor, the air pressure supply in the park brake line being monitored depending on backup stability signals received from the backup stability sensors under the condition of the park brake line being used as a backup deceleration system. Thanks to data gathered by the three sensors, a complete picture of the dynamic behaviour of the vehicle is determined in real-time.

According to one aspect, the service brake system comprises at least a service brake control unit configured to receive the main signals from the main motion sensors and to control the air pressure supply in the service brake line depending on the main signals received from the main motion sensors. Also, the service brake control unit receives signals coming from a brake foot pedal provided in the vehicle.

According to one aspect, the service brake control unit comprises at least one brake module, the service brake control unit being configured to deliver braking control signals to the brake module, and the brake module being configured to control the air pressure supply in the service brake line. Such brake modules are advantageously located not far from the brake actuators at the wheels, thereby minimizing air volume in the piping, minimizing time delay for control.

According to one aspect, the park brake system comprises a park brake control unit configured to control the air pressure supply in the park brake line. Thus, the conventional function of park brake function can be carried out through the park brake control unit. When the park brake control unit purges the park brake lines, then the park brake is set.

According to one aspect, the park brake control unit can be configured to monitor the service brake control unit by continuously checking messages received from the service brake control unit. This carries out a watchdog function, so that whenever a malfunction occurs at the service brake control unit, the park brake control unit can take the decision to take over the control of the braking action with at least anti-lock function and, preferably, stability control function.

According to one aspect, the park brake system comprises a backup control unit configured to receive the backup signals from the backup motion sensors and to control the air pressure supply in the park brake line depending on the backup signals received form the backup motion sensors under the condition of the park brake system being used as a backup deceleration system.

According to one alternative, the backup control unit is a single unit comprising the pressure controller device and the stabilization device, whereby the cost effectiveness of the overall system is improved.

According to another alternative, the backup control unit comprises the pressure controller device forming a first unit and the stabilization device forming a second unit, the stabilization device being configured to deliver braking control signals to the pressure controller device, and the pressure controller device being configured to control the air pressure supply in the park brake line. Regulation of pressure in the park brake lines can be carried out in values according to the electrical architecture and computing distribution over one of several control unit(s).

According to one aspect, the park brake control unit is integral with the backup control unit. Thereby we provide a cost-effective solution.

According to one aspect, the main motion sensors are connected to the service brake control unit through wired connections and the backup motion sensors are connected to the backup control unit through wired connections.

According to one aspect, the main motion sensors are connected to a main intermediate module which is configured to receive and send the main signals sent by the main motion sensors to the service brake control unit through a main communication bus, and wherein the backup motion sensors are connected to a backup intermediate module which is configured to receive and send the backup signals sent by the backup motion sensors in the park brake control unit through a backup communication bus which is different from the main communication bus.

The proposed intermediate modules serve as front-end for data collection from sensors.

According to one aspect, the main intermediate module and the backup intermediate module are configured to exchange with each other the main signals and the backup signals.

According to one aspect, the electro-pneumatic brake system comprises a duplicated service brake system forming a duplicated pneumatic deceleration system. This can be useful for compliance about vehicles equipped with full autonomy functions.

According to one aspect, the electro-pneumatic brake system comprises a duplicated park brake system forming a duplicated pneumatic immobilization system. This can be relevant for compliance about vehicles equipped with full autonomy functions.

The invention is also directed to an automotive vehicle including an electro-pneumatic brake system as described above.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements. Unless stated otherwise, the pneumatic lines are shown thicker than the electrical lines.

Figure 1:
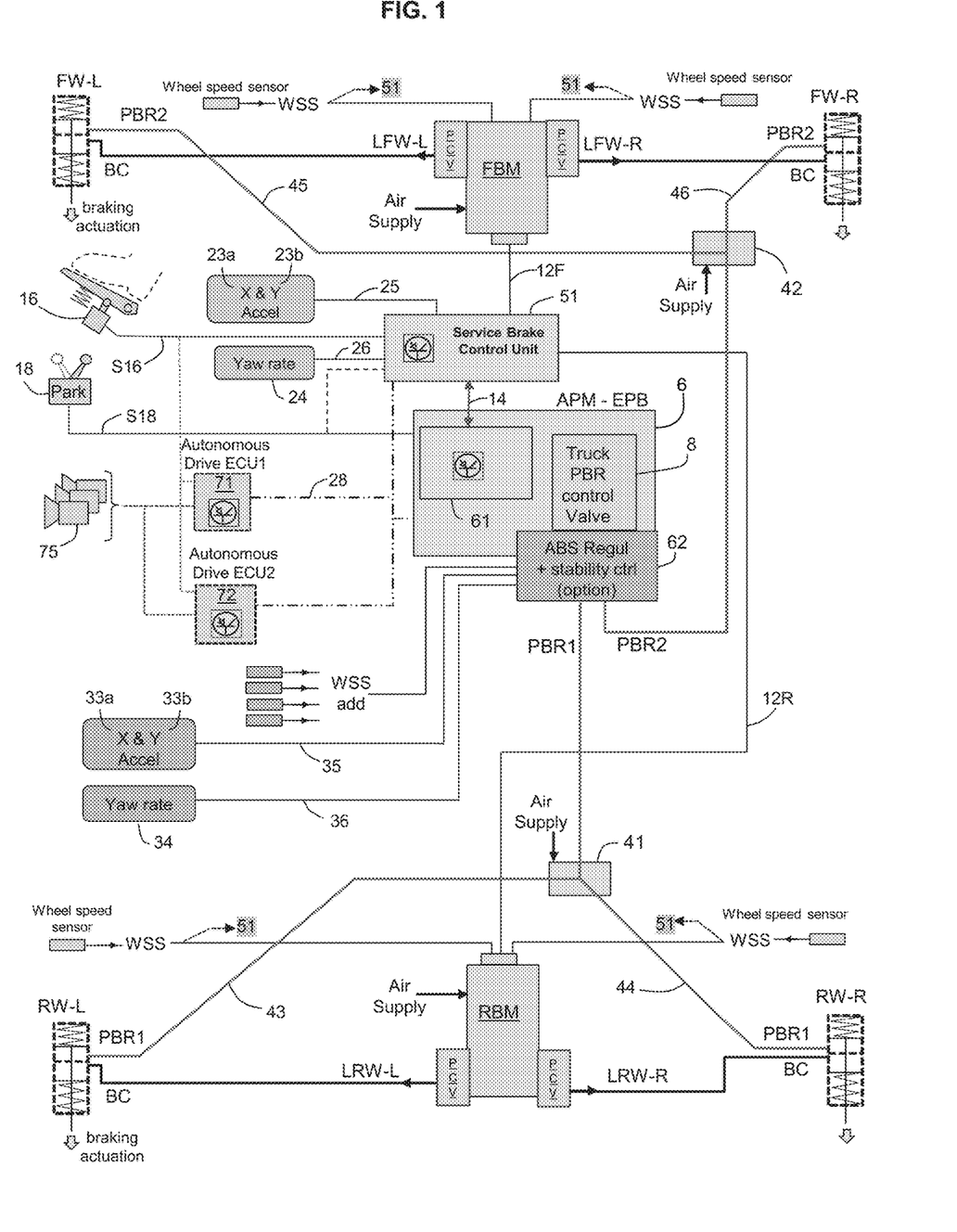
FIG. 1 illustrates a diagrammatical circuit layout of an electro-pneumatic braking system for a truck according to a first embodiment.

FIG. 1 shows a diagrammatical circuit layout of an electro-pneumatic braking system for a truck. The proposed configuration is also valid for any kind of heavy-duty vehicles including buses and coaches.

The truck considered here can be the traction unit in a tractor/trailer configuration or it can be a utility "carrier" truck.

At least one front axle is a steering axle, without excluding other axle(s) having a steering function including a rear axle.

The truck considered here can have one or more level(s) of autonomous drive functionalities, entailing reinforced needs for redundancy in braking systems.

Overview of the Braking System

The electro-pneumatic brake system according to the invention comprises four brake actuators RW-L, RW-R, FW-L, FW-R, respectively one for the rear left wheel, one for the rear right wheel, one for the front left wheel and one for the front right wheel. For the sake of clarity we have represented the same brake actuator for all the wheels, but of course, there may be variations and difference according to the location of the wheel (front, rear, trailer etc. . . . ).

There may be also provided more than 4 brake actuators, in case there are two front axles, and/or two or more rear axles. The number of brake actuators can amount to 2,4,6,8, or more. It is worth noting that some brake actuators can be deprived of the parking brake function. The number of brake actuators can be twice the number of axles.

The brake actuators RW-L, RW-R, FW-L, FW-R can be combined service brake and park brake actuators.

Figure 2:
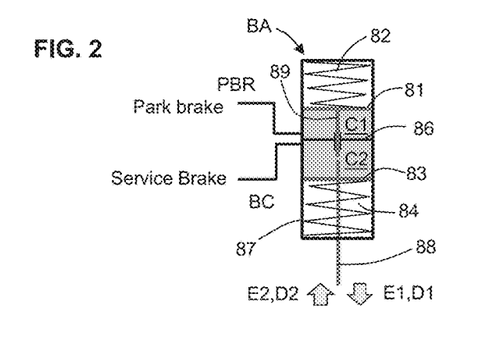
FIG. 2 illustrates a brake pneumatic actuator.

As shown on FIG. 2 each brake actuator (generically referred to as BA) includes a first piston 81 loaded by a first spring 82 which exerts a first effort E1 in a first direction D1. Brake actuator BA also includes a second piston 83 loaded by a second spring 84 which exerts a second effort E2 in a direction D2 opposite to direction D1. Piston 83 is rigid with an output rod 88 of brake actuator which drives an associated brake mechanism (brake pads, disc, etc. not shown). Rod 88 and/or second piston 83 is/are pushed by rod 89 rigid with first piston 81. A fixed wall 86 is mounted within a housing 87 of brake actuator. Wall 86 defines, respectively with pistons 81 and 83, a service brake chamber C2 and a park brake chamber C1 of a variable volume. The rod 88 is coupled to the piston 83, crosses the wall 86 in an air-tight manner and is coupled to the piston 81. Springs 82 and 84 are chosen so that effort E1 is larger than effort E2. Thus, in absence of air pressure within the service brake chamber C2 and the park brake chamber C1, effort E1 pushes piston 81 in direction D1. This effort is transmitted by rod 89 to rod 88 to actuate the associated brake mechanism in a first direction. Under such circumstances, brake mechanism engages the brake disk(s) or drum(s) of the associated rear left wheel or wheels. This corresponds to a park brake actuation for truck. In other words, when no air under pressure is provided to brake actuator BA, the park brake of truck is actuated. Instead of pistons, flexible membranes or diaphragms can be used.

When air under pressure is provided to the park brake chamber C1 supplied by input PBR (Parking Brake Release, respectively PBR2 or PBR1 for front and rear), the air pressure within this chamber pushes piston 81 against the action of spring 82 and spring 84 pushes piston 83 in direction D2. This corresponds to the release of the park brake of truck by air pressure.

When the park brake has been released and if air under pressure is provided to the service brake chamber C2 supplied by input BC (Brake control), the air pressure within the service brake chamber C2 pushes piston 83 in direction D1 which progressively actuates brake mechanism in order to brake the corresponding wheel or wheels. The mechanical effort delivered by the actuator to the brake mechanism increases with the air pressure delivered to service brake chamber C2. This corresponds to the actuation of the service brake of truck. The service brake actuator is the device which transforms the air pressure into a mechanical force.

Turning now to FIG. 1, the electro-pneumatic brake system comprises a service brake system which supplies air pressure to the service brake chamber C2 of the brake actuators RW-L, RW-R, FW-L, FW-R, respectively through a rear left service brake line LRW-L, a rear right service brake line LRW-R, a front left service brake lines LFW-L, and a front right service brake line LFW-R.

The electro-pneumatic brake system also comprises a park brake system which supplies air pressure to the park brake chamber C1 of the brake actuators RW-L, RW-R, FW-L, FW-R, respectively through a rear park brake line PBR1 and a front park brake line PBR2.

The service brake system is used to slow down and to stop the vehicle during normal operation, whatever the speed of the vehicle, and thus forms what is called a deceleration system of the vehicle.

The park brake system is used mainly to maintain the vehicle stopped when it is not in use, and thus forms what is called an immobilization system of the vehicle.

As it will be described below, the park brake system can also be used to slow down and to stop the vehicle during normal operation, whatever the speed of the vehicle, if a failure of the service brake system occurs. The park brake is thus used as a backup deceleration system.

As known per se, there is provided a parking brake electric input device 18 outputting an electric signal S18, for the parking brake operation. The brake system comprises a service brake electric input device 16 (formed generally as a brake foot pedal) delivering a first input electric signal S16 for the service brake operation.

Service Brake

The service brake system comprises main motion sensors comprising main wheel speed sensors WSS and main stability sensors. The main stability sensors comprise a main lateral acceleration sensor 23b, a main longitudinal sensor 23a, and a main yaw rate sensor 24. Main wheel speed signals and main stability signals sensed by the main motion sensors are received by a service brake control unit. The service brake control unit then controls the air pressure supply in the service brake line depending on the received signals, thereby performing stability control functions such as ABS, ESP, Antiskid, and the like.

In the illustrated example, the service brake control unit comprises a front axle brake module FBM and a rear axle brake module RBM and a service brake control unit 51.

On FIG. 1, one brake module per axle is represented, e.g. the front axle brake module FBM and the rear axle brake module RBM are represented. However, in other configurations, there may be provided one brake module associated for each brake actuator. A trailer attached to the truck can also comprise similar wheel brake control device.

The front axle brake module FBM provides generally pneumatic control pressure to the left and right front pneumatic brake actuators FW-L, FW-R, through pressure control valves (PCV in short) via the front left service brake line LFW-L and the front right service brake line LFW-R. The front left and right service brake lines LFW-L, LFW-R each connects an output of the front axle brake module FBM with the service brake chamber C2 of respectively the front left and front right braking actuator FW-L, FW-R, and supply air pressure to the corresponding service brake chamber C2.

Compressed air is supplied, to the front axle brake module FBM and to the rear axle brake module RBM, denoted "Air Supply" at the figures. "Air Supply" provides compressed air at a pressure level slowly evolving over time within a prescribed operating range (in practice it is the pressure prevailing in the reservoir from which the air supply comes from).

The front axle brake module FBM receives pneumatic braking setpoint through an electrical control line 12F. The rear axle brake module RBM receives pneumatic braking setpoint through an electrical control line 12R.

In one embodiment, the front axle brake module FBM receives main wheel speed signals from main wheel speed sensors WSS. Each pressure control valves PCV perform an anti-locking function (ABS function) based on the main speed signals. For example, each pressure control valve PCV has a first valve in a series arrangement that can block the passage of air down to the brake chamber, and a second valve that can take out air from the brake chamber circuit and release it to the atmosphere. These valves are controlled in accordance with the real time analysis of the speed of each wheel.

The rear axle brake module RBM provides generally pneumatic control pressure to the left and right rear pneumatic brake actuators RW-L, RW-R with an arrangement similar to one of the front axle brake modules FBM, comprising a rear left service brake line LRW-L and a rear right service brake line LRW-R. The rear axle brake module RBM also receives main wheel speed signals from main wheel speed sensors WSSII. Each pressure control valves PCV perform the anti-locking function (ABS function) based on the main speed signals.

The service brake control unit 51 delivers braking control signals to the brake modules FBM, RBM. The brake modules FBM, RBM then control the air pressure supply in the service brake lines LFW-L, LFW-R, LRW-L, LRW-R depending on the delivered braking control signal.

Each of the front and rear axle brake modules FBM, RBM, is an electro-pneumatic device, known per se, providing a pneumatic relay function. In short, it selectively takes air from the compressed air supply and selectively releases air to the atmosphere while following faithfully the control signals (electrical and/or pneumatic) sent by the service brake control unit 51.

The service brake control unit 51 receives main stability signals from the main lateral acceleration sensor 23b, the main longitudinal acceleration sensor 23*a* through line 25, and receives signal from the main yaw rate sensor 24 through line 26. The control signals send by the service brake control unit 51 to the brake modules FBM, RBM through lines 12F 12R depending on the main stability signals received by the service brake control unit 51, and the brake modules FBM, RBM monitor the air pressure supply in the service brake lines depending on the main stability signals.

In an alternate embodiment not shown at the circuit diagram, the wheel speed sensor information is delivered directly to the service brake control unit instead of locally to the front and rear modules. In this case, the braking pressure regulation takes place directly in the service brake unit 51.

Air Supply and Park Brake

The electro-pneumatic brake system also comprises an air production module 6 ('APM' in short), preferably housing components inside a protective enclosure, thereby providing protection against mechanical and fluid attacks. The air production module 6 is located behind the cabin, accessible from one side of the truck for carrier type truck, or accessible from top side if/when the cabin is tilted or rocked. The air production module 6 may comprise various valves, solenoids, relay valves and pressure sensor.

There are provided one or more air supply circuit(s) to supply compressed air respectively to the front and rear axle brake modules FBM, RBM, and to supply compressed air generally to the park brake function, and also possibly to a trailer. According to various embodiments, the supply circuit exhibit simple or more advanced redundancy.

The air production module 6 is in charge of providing said one or more air supply circuit(s), with a pressure level slowly evolving over time within a prescribed operating range. The air production module 6 may comprise two or more air reservoirs, as known per se.

Two or three air reservoirs (not represented) are connected respectively to first, second and third air supply circuits which are designed to be independent from one another. Air supply circuits have usually a target service pressure set around 12 bars. In practice, air supply circuits may have a service pressure comprised in the range [5 bars-15 bars], preferably comprised in the range [7 bars-12 bars].

The first air supply circuit provides air under pressure to the rear axle brake module RBM, sometimes called "primary" circuit. The second air supply circuit provides air under pressure to the front axle brake module FBM, sometimes called "secondary" circuit.

The park brake system comprises a park brake control unit 61 and a truck PBR relay valve 8. The park brake control unit 61 and the truck PBR relay valve 8 are housed in the air production module 6. An air supply circuit supplies air to the truck PBR control valve 8. The park brake control unit 61 of the APM 6 controls the air pressure supply in the park brake lines PBR1, PBR2, on the one hand for the conventional park brake function and on the other hand a backup deceleration function.

The parking brake electric input device 18 outputs an electric signal S18, which is delivered to the park brake control unit 61 of the APM 6. Under the normal functioning of the service brake system, the park brake system is used as an immobilization system. The park brake system is actuated by the parking brake electric input device 18, in an ON/OFF logic.

The park brake system also comprises backup motion sensors comprising backup wheel speed sensor WSSadd and backup stability sensors comprising a backup lateral acceleration sensor 33*b*, a backup longitudinal sensor 33*a*, and a backup yaw rate sensor 34. Backup wheel speed signals and backup stability signals sensed respectively by the backup wheels speed sensors WSSadd and the main stability sensors are received by a backup control unit 62. The backup control unit 62 can then control the air supply in the park brake lines PBR1, PBR2 depending on the backup signals received, under the condition of the park brake system being used as a backup deceleration system. Stability control functions such as ABS, ESP, Antiskid, and the like are available here from park brake system.

The park brake system comprises its own wheel speed sensors and its own stability sensors, thereby providing redundancy with respect to the service brake system. In case of a failure of the service brake system, the control of the braking is done upon the reception of backup wheel speed signals and backup stability signals which are independent from the main wheel speed signal and main stability signals used by the service brake system.

According to alternate embodiments, the backup deceleration function may use the main motion sensors comprising main wheel speed sensors WSS and main stability sensors, instead of additional sensors.

According to alternate embodiments, there may be provided twin sensors arranged in a single package. For example at each wheel, a double speed sensor is considered with two independent outputs but housed in a single casing (with one or two connectors).

The backup control unit 62 is housed in the air production module 6. The backup control unit 62 controls the air pressure supply in the park brake lines PBR1, PBR2 under the condition of the park brake system being used as a backup deceleration system. The backup control unit 62 comprises a pressure controller performing a wheel anti-locking function (ABS function) under the condition of the park brake system being used as a backup deceleration system and a stabilization device performing a vehicle stabilization control function under the condition of the park brake system being used as a backup deceleration system.

Thanks to the pressure controller, the trajectory of the vehicle can be mastered when the park brake is used as a backup deceleration system. The pressure controller can for example be a pressure control valve. The stabilization device improves the control of the trajectory of the vehicle by applying more or less braking pressure to each wheel in order to maximize stopping power whilst maintaining vehicle control.

The park brake control unit 61 and the backup control unit 62 are represented as two distinct units. However, according to an alternative, the park brake control unit 61 could be integral with the backup control unit 62.

The air supply provided by the backup control unit 62 in each park brake lines PBR1, PBR2 is then distributed on each wheel of the vehicle. In the illustrated example, the air supply provided in the rear park brake line PBR1 is distributed on the left and right rear actuators RW-L, RW-R for the left and right rear wheels, and the air supply provided in the front park brake line PBR2 is distributed on the left and right front actuators FW-L, FW-R.

More precisely, as shown at FIG. 1, there is provided a relay function with a front relay valve 42 and a rear relay valve 41, both supplied by the centralized air supply, possibly with redundancy. Downstream the rear relay valve 41, a left pipe 43 supplies the park brake chamber of the rear left brake actuator RW-L, a right pipe 44 supplies the park brake chamber of the rear right brake actuator RW-R. Similarly downstream the front relay valve 42, a left pipe 45 supplies the park brake chamber of the front left brake actuator FW-L, a right pipe 46 supplies the park brake chamber of the front right brake actuator FW-R. The air volume in pipes 43,44,45,46 is small, thereby allowing quick reaction in response to the control pressure signal coming from lines PBR1, PBR2 outputted by the backup control unit 62. Response time is much shorter than response time usually encountered in conventional park brake function.

It is to be noted that the term "park brake line(s)" in the claim encompasses generally pneumatic lines between the backup control unit 62 and the brake actuators, whatever the possible implementations, irrespective of the presence of the relay valves 41 42.

There may be a single line, i.e. the single output from the backup control unit. There may be two lines as shown at the figures. It is not excluded to have more than two lines depending on the number of axles to be braked.

The park brake control unit 61 provides surveillance of proper operation of the service brake control unit 51. To this end, there is provided between those two units a data exchange denoted 14. More precisely, the park brake control unit 61 monitors the service brake control unit's proper operation by continuously checking messages received from the service brake control unit. This forms a watchdog function, so that whenever a malfunction occurs at the service brake control unit, the park brake control unit makes the decision to take over the control of the braking action. Also, whenever a malfunction is determined at the service brake, the service brake controller 51 can transfer operational control to the backup control unit 62.

Figure 4:
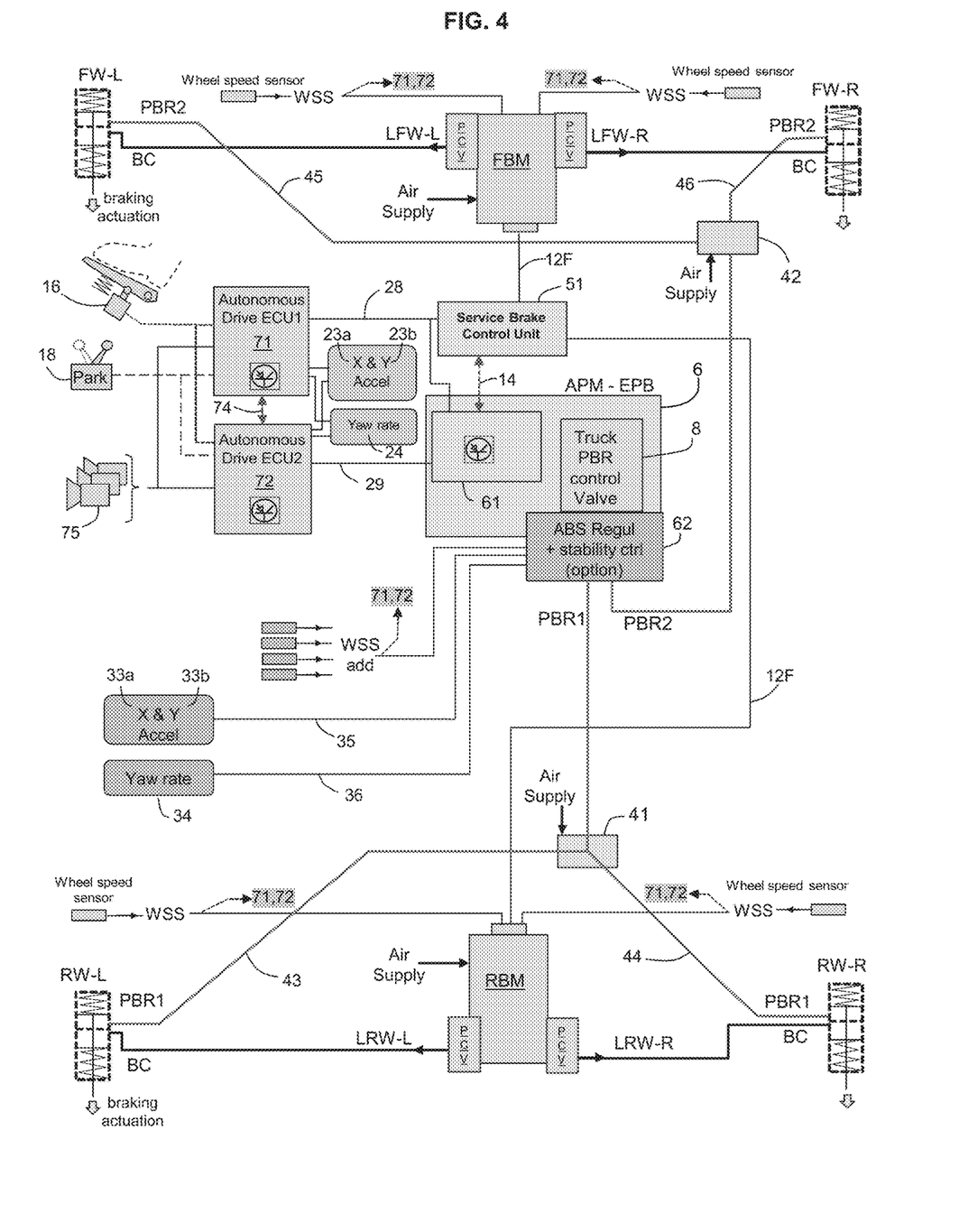
FIG. 4 illustrates a diagrammatical circuit layout of an electro-pneumatic braking system for a truck according to a second embodiment.

FIG. 1 represents a vehicle where manned driving is the basic operation, however there is provided driving assistance function(s) like lane/track follow function, preceding vehicle distance regulation, etc, whereas FIG. 4 represents a vehicle for which unmanned driving is the basic operation but there is still provided conventional controls. Therefore for the sake of conciseness, all the pneumatic system is similar or identical in FIGS. 4 and 1, and thus the description is not repeated. Only the high-level controls differ in FIG. 4 with respect to FIG. 1.

For simple or more advanced autonomous driving, there is provided first and second autonomous drive control units 71,72 that rely on at least on cameras 75 which provide a flow of images which are analyzed in the autonomous drive control units 71,72. There may be provided other types of sensors like radars, lidars or the like, and also communication data received from various traffic aware entities (from fixed or mobile entities).

Electrical control signals may be conventional electrical control signals on dedicated lines or messages transported on a databus, like a CAN-bus or a like data bus. As exemplified in FIG. 1, a CAN bus 28 establishes a data link between autonomous drive control units 71,72, the park brake control unit 61 and the service brake unit 51.

Optionally, the first and second autonomous drive control units 71, 72 also receive the first input electric signal S16 coming from the service brake electric input device 16.

Turning to FIG. 4, autonomous drive control units 71,72 have a much more important functional content. For safety reasons, there are fully redundant. The autonomous drive control units 71,72 are also called vehicle motion management controllers in this instance.

Further, there is provided between the two autonomous drive control units 71,72 a data exchange denoted 74. More precisely the first autonomous drive control unit 71 monitors the second autonomous drive control unit 72 proper operation by continuously checking messages received from the second autonomous drive control unit 72. Conversely the second autonomous drive control unit 72 monitors the first autonomous drive control unit 71 proper operation by continuously checking messages received from the first autonomous drive control unit 71.

This forms a watchdog function, so that whenever a malfunction occurs at one or the other autonomous drive control units, the other substitutes to take control of the vehicle motion control, including braking.

Figure 3:
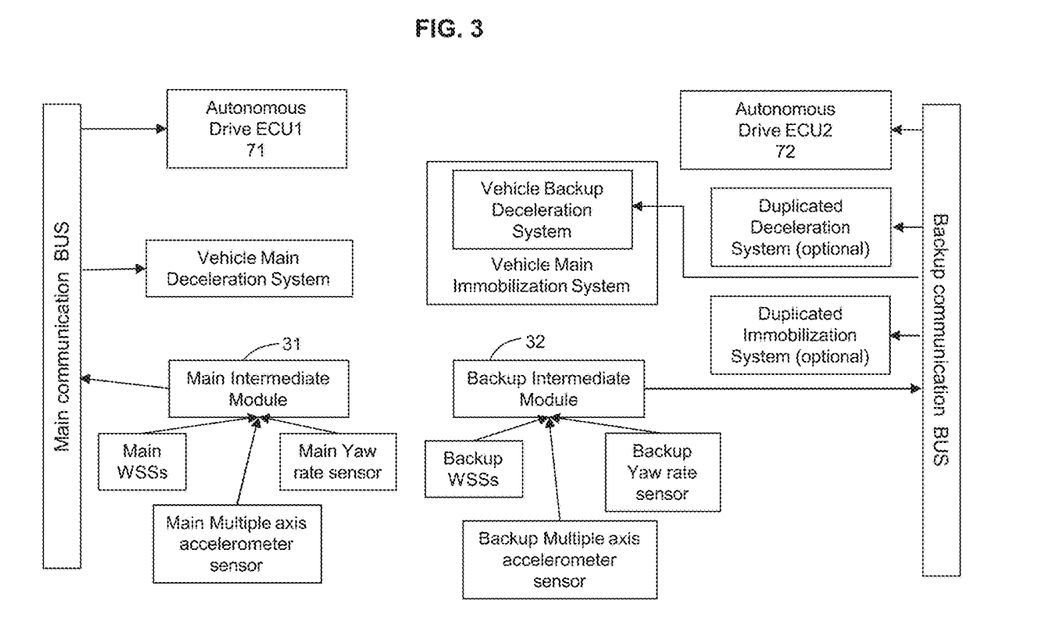
FIG. 3 illustrates a functional diagram involving the main deceleration system, the backup desertion system and possibly duplicated deceleration system.

One example of the connection of the wheel speed sensors and the stability sensors to the service brake system and park brake system is illustrated on FIG. 3.

The main motion sensors are connected to a main intermediate module 31. The main intermediate module 31 receives the main wheel speed signals and the main stability signals from the main wheel speed sensors and from the main stability sensors, and sends the main wheel speed signals and the main stability signals to the service brake system, and for example to the service brake control unit, through a main communication bus.

The backup motion sensors are connected to a backup intermediate module 32. The backup intermediate module 32 receives the backup wheel speed signals and the backup stability signals from the backup wheel speed sensors and from the backup stability sensors, and sends the backup wheel speed signals and the backup stability signals to the park brake system, for example to the backup control unit 62, through a backup communication bus which is different from the main communication bus.

The main intermediate module and the backup intermediate module can exchange with each other the main signals and the backup signals.

Therefore, two fully independent braking channels are provided, resulting in high rating redundancy.

In an unrepresented alternative, the main motion sensors could be connected to the service brake system, and for example to the service brake control unit through wired connections and the backup motion sensors could be connected to the park brake system, for example to the backup control unit 62 through wired connections.

Figure 5:
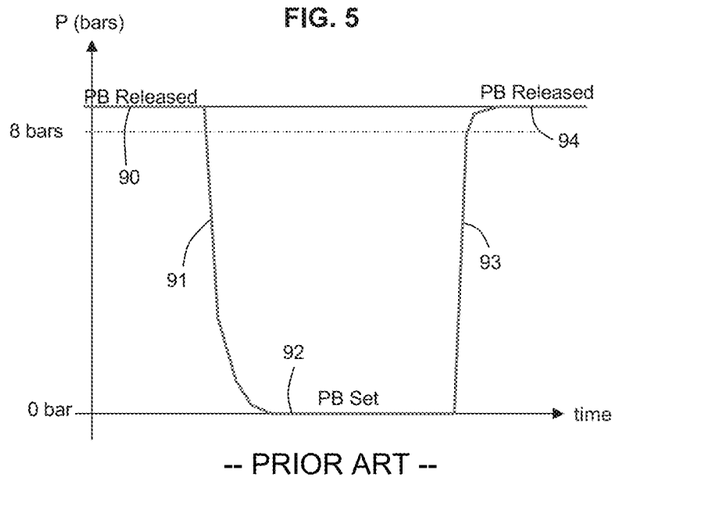
FIG. 5 illustrates a time chart relating to a conventional parking brake.

As illustrated at FIG. 5, under the conventional operation of park brake, only two pressure levels are used. When the park brake lines are purged, i.e. pressure is 0 bar, the park brake is set (ref 92). Conversely, in order to release the park brake, the park brake lines are pressurized, that is to say set to the current pressure prevailing in the reservoir (ref 90, 94). For example, the pressure can be 8.5 bar. It is a macroscopic binary behavior. We note that the transitions 91, 93 can take some time for the conventional operation of park brake.

Figure 6:
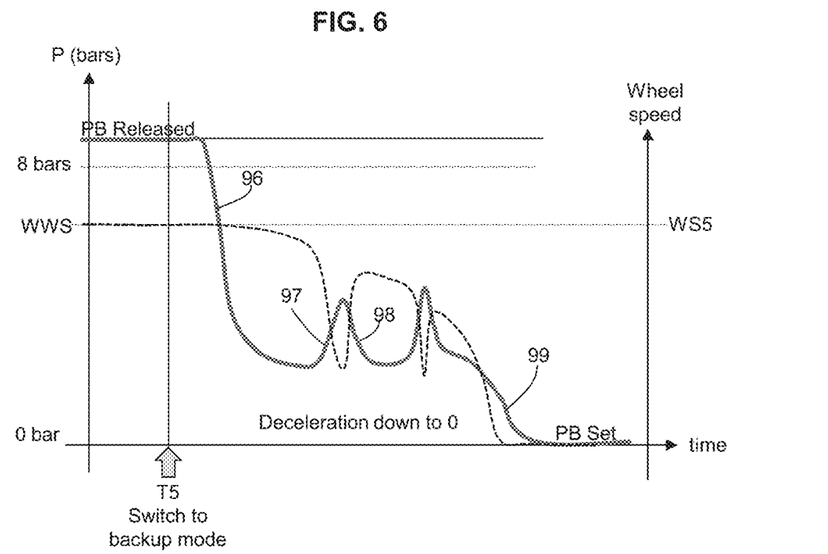
FIG. 6 illustrates a time chart relating to a parking brake system forming a backup deceleration system with regulation.

By contrast, as illustrated in FIG. 6, under the special mode of backup deceleration function, when it is decided that the park brake should take control, at moment T5, the park brake pressure is controlled to decrease 96 until a significant braking force is applied to the wheels. A significant braking force is applied from the moment the park brake pressure reaches the contact point in the park brake line. Typically, the contact point is set around 4.5 bars. When the park brake pressure is above the contact point, the braking force applied to the wheels is not enough to slow down the vehicle. Therefore, the backup deceleration function operates when the park brake pressure is between the contact point and 0 bar.

Thereafter, regulation processes are illustrated. In the regulation process, the speed of each wheel of the vehicle is monitored by comparing each wheel speed to the vehicle reference speed. The vehicle reference speed corresponds to an estimation of the wheel speed of the vehicle. This estimation can, for example, be equal to the mean value of the speed of the fastest wheels of the vehicle, for instance of the two fastest wheels.

When a wheel speed denoted WSS decreases faster than plausible namely, when the wheel speed reaches a value which is below a predetermined threshold below the vehicle reference speed (which denotes a start of locking), the park brake pressure is controlled to be increased 97 to relief the braking force. The wheel speed thus increases. Responsive to this wheel speed increase up to a value close to the vehicle reference speed, the pressure is decreased again 98 to re-apply a braking force. The above process is iterative and is carried out repeatedly in real time for each wheel.

This is only a schematic representation of the known anti-locking regulation. On top of that there may be provided a stabilization function where some slippage/locking of one or more wheels is admitted provided that the general stability remains under control (prevention of veering).

At the end of the regulation phase, there is often a stopping phase 99 with the speed coming down to a speed sufficiently small that it is not measurable by the system and the spring break fully applies (0 bar).

In order to release the park brake again, the park brake lines are pressurized again. To ensure that the park brake is released, the park brake pressure has to be set above the release point, typically the release point is set at 5.5 bars.

It shall be understood that when the park brake is used as a redundant backup brake system, the pressure prevailing in the service brake lines BC may be set to 0, or may be a lower value than expected, which is the case when an air leak occurred in the service brake. In this case, the air pressure prevailing in the second chamber C2 of the brake actuator BA exhibits little or no influence on the braking force E1.

In order to further increase the redundancy of the electro-pneumatic braking system, the electro-pneumatic braking system could also comprise a duplicated service brake system forming a duplicated deceleration system. The duplicated service brake system could be used if a failure of the service brake system occurs. The park brake used as a backup deceleration system would then be used if both the service brake system and the duplicated service brake failed.

The electro-pneumatic braking system could also comprise a duplicated park brake system forming a duplicated pneumatic immobilization system. The duplicated park brake system would be used if the park brake system failed.

It shall be noted that the main lateral acceleration sensor 23b, the main longitudinal acceleration sensor 23a and the main yaw rate sensor 24 can be housed in a single package. Also the backup lateral acceleration sensor 33b, the backup longitudinal acceleration sensor 33a and the backup yaw rate sensor 34 can be housed in another single package.

The invention claimed is:

1. An electro-pneumatic brake system for an automotive vehicle comprising:
   a plurality of brake actuators each with a service brake chamber and a park brake chamber,
   a service brake system forming a pneumatic main deceleration system and comprising at least one service brake line configured to supply air pressure to a service brake chamber of at least one of the plurality of brake actuators, and
   a park brake system forming a pneumatic immobilization system and a backup pneumatic deceleration system, and comprising at least one park brake line configured to supply air pressure to a park brake chamber of at least one of the plurality of brake actuators,
   wherein the park brake system comprises a pressure controller device configured to perform a wheel anti-locking function under a condition of the park brake system being used as the backup deceleration system, the pressure controller device being configured to control the air pressure supply in the at least one park brake line.

2. The electro-pneumatic brake system of claim 1, wherein the park brake system comprises a stabilization device configured to perform a vehicle stabilization control function under the condition of the park brake system being used as the backup deceleration system, the stabilization device being configured to control the air pressure supply in the at least one park brake line.

3. The electro-pneumatic brake system of claim 1, wherein the service brake system comprises main motion sensors including main wheel speed sensors, the air pressure supply in the service brake line being controlled depending on main wheel speed signals received from the main wheel speed sensors, and wherein the park brake system comprises backup motion sensors including backup wheel speed sensors, the air pressure supply in the park brake line being controlled depending on backup wheel speed signals received from the backup wheel speed sensors under the condition of the park brake system being used as the backup deceleration system.

4. The electro-pneumatic brake system of claim 3, wherein the main motion sensors include main stability sensors comprising at least one of a main lateral acceleration sensor, a main longitudinal acceleration sensor, or a main yaw rate sensor, the air pressure supply in the service brake line being monitored depending on main stability signals received from the main stability sensors, and wherein the backup motion sensors include backup stability sensors comprising at least one of a backup lateral acceleration sensor, a backup longitudinal acceleration sensor, or a backup yaw rate sensor, the air pressure supply in the park brake line being monitored depending on backup stability signals received from the backup stability sensors under the condition of the park brake line being used as the backup deceleration system.

5. The electro-pneumatic brake system of claim 3, wherein the service brake system comprises a service brake control unit configured to receive the main wheel speed signals from the main motion sensors and to control the air pressure supply in the service brake line depending on the main wheel speed signals received from the main motion sensors.

6. The electro-pneumatic brake system of claim 5, wherein the service brake system further comprises at least one brake module, the service brake control unit being configured to deliver braking control signals to the brake module, the brake module being configured to control the air pressure supply in the service brake line.

7. The electro-pneumatic brake system of claim 5, wherein the park brake system comprises a park brake control unit configured to control the air pressure supply in the park brake line.

8. The electro-pneumatic brake system of claim 7, wherein the park brake control unit is configured to monitor the service brake control unit by continuously checking messages received from the service brake control unit.

9. The electro-pneumatic brake system of claim 5, wherein the park brake system comprises a backup control unit configured to receive the backup wheel speed signals from the backup motion sensors and to control the air pressure supply in the park brake line depending on the backup wheel speed signals received form the backup motion sensors under the condition of the park brake system being used as the backup deceleration system.

10. The electro-pneumatic brake system of claim 9, wherein the park brake control unit is integral with the backup control unit.

11. The electro-pneumatic brake system of claim 9, wherein the main motion sensors are connected to the service brake control unit through wired connections and the backup motion sensors are connected to the backup control unit through wired connections.

12. The electro-pneumatic brake system of claim 9, wherein the main motion sensors are connected to a main intermediate module which is configured to receive and send the main wheel speed signals sent by the main motion sensors to the service brake control unit through a main communication bus, and wherein the backup motion sensors are connected to a backup intermediate module which is configured to receive and send the backup wheel speed signals sent by the backup motion sensors in the park brake control unit through a backup communication bus which is different from the main communication bus.

13. The electro-pneumatic brake system of claim 12, wherein the main intermediate module and the backup intermediate module are configured to exchange with each other the main wheel speed signals and the backup wheel speed signals.

14. The electro-pneumatic brake system of claim 1, comprising a duplicated service brake system forming a duplicated pneumatic deceleration system.

15. The electro-pneumatic brake system of claim 1, comprising a duplicated park brake system forming a duplicated pneumatic immobilization system.

16. An automotive vehicle comprising:
an electro-pneumatic brake system for the automotive vehicle comprising:
  a plurality of brake actuators each with a service brake chamber and a park brake chamber,
  a service brake system forming a pneumatic main deceleration system and comprising at least one service brake line configured to supply air pressure to a service brake chamber of at least one of the plurality of brake actuators, and
  a park brake system forming a pneumatic immobilization system and a backup pneumatic deceleration system, and comprising at least one park brake line configured to supply air pressure to a park brake chamber of at least one of the plurality of brake actuators,
  wherein the park brake system comprises a pressure controller device configured to perform a wheel anti-locking function under a condition of the park brake system being used as the backup deceleration system, the pressure controller device being configured to control the air pressure supply in the at least one park brake line.

* * * * *